July 20, 1965  E. H. MEYERS ETAL  3,195,751
CORE LIFT FOR INDUSTRIAL TRUCKS

Filed Feb. 21, 1962  4 Sheets-Sheet 1

INVENTORS
ELLWOOD H. MEYERS,
AND ROBERT L. KEPLER,
BY
*Linton & Linton*
ATTORNEYS.

July 20, 1965  E. H. MEYERS ETAL  3,195,751
CORE LIFT FOR INDUSTRIAL TRUCKS
Filed Feb. 21, 1962  4 Sheets-Sheet 2
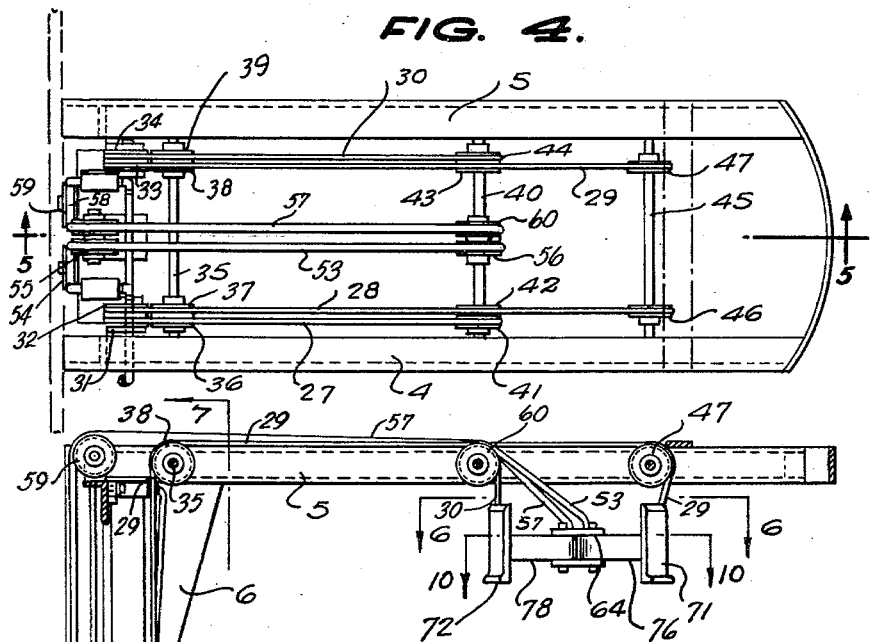
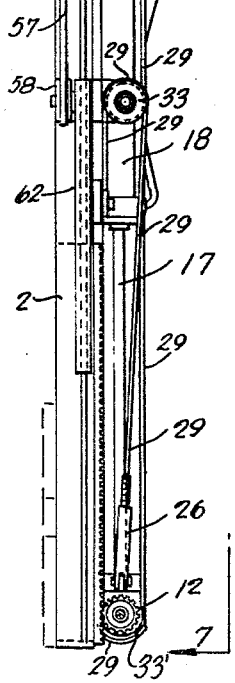
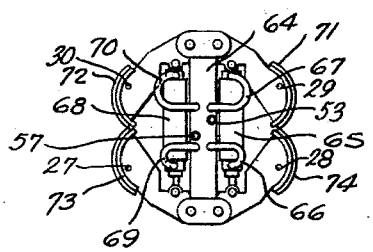
INVENTORS
ELLWOOD H. MEYERS,
AND ROBERT L. KEPLER,
BY
Linton & Linton
ATTORNEYS.

July 20, 1965

E. H. MEYERS ETAL 3,195,751

CORE LIFT FOR INDUSTRIAL TRUCKS

Filed Feb. 21, 1962

INVENTORS
ELLWOOD H. MEYERS,
AND ROBERT L. KEPLER,
BY

Linton & Linton
ATTORNEYS.

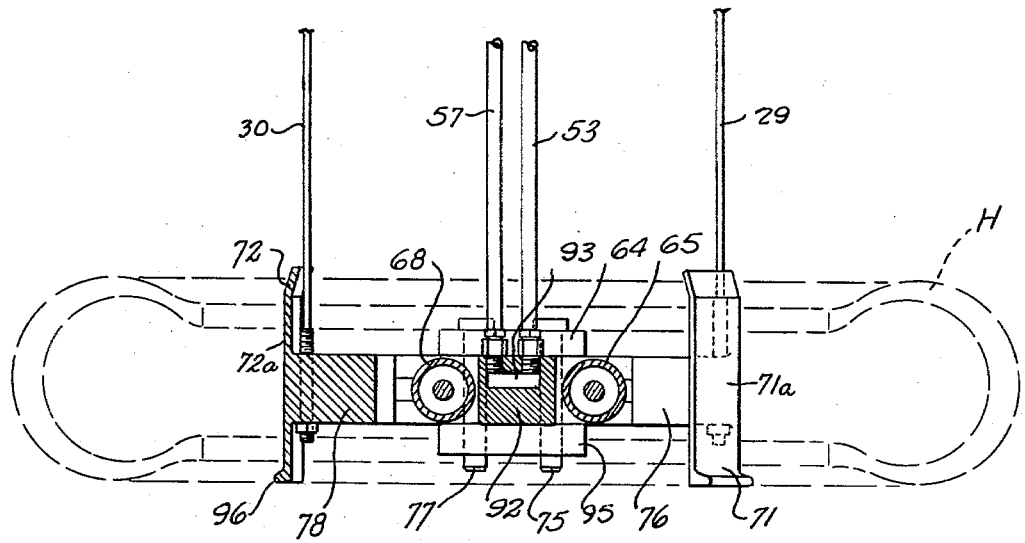
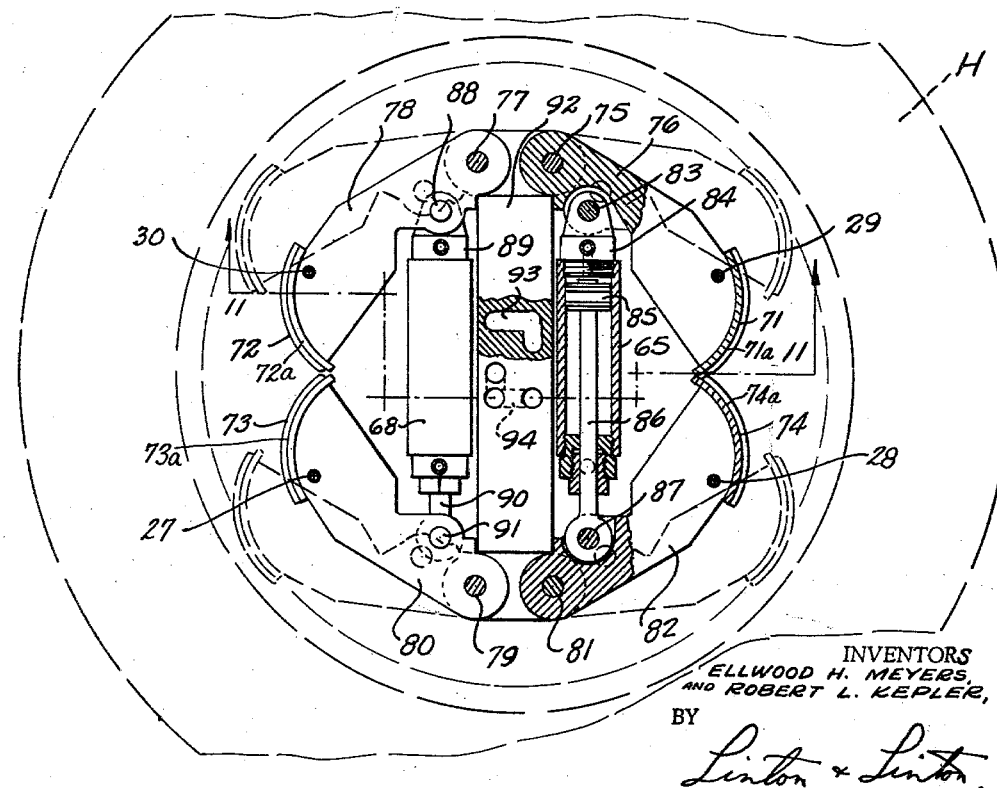

United States Patent Office 3,195,751
Patented July 20, 1965

3,195,751
CORE LIFT FOR INDUSTRIAL TRUCKS
Ellwood H. Meyers and Robert L. Kepler, Cleveland, Ohio, assignors to Morrison Company, Cuyahoga County, Ohio, a corporation of Ohio
Filed Feb. 21, 1962, Ser. No. 174,872
5 Claims. (Cl. 214—620)

The present invention is related to apparatus for handling and conveying articles and is more particularly concerned with an attachment for vertical masts, for lifting, lowering and conveying one or more articles having an inner opening.

The principal object of the present invention is to provide an attachment for fixed or mobile vertical masts including those having a vertically raisable member, for supporting the attachment and which attachment can be operated for lifting and lowering annular articles such as automobile tire casings, one at a time or in stacks thereof and conveying the same from one location to another requiring only very limited headroom above the articles.

Another and important object of the invention is to provide a device for handling articles having a center opening and of various heights, sizes, and weights and which device has a self centering load supporting and lifting head for entering the central opening in stacks of partially misaligned annular articles having openings of various inside dimensions or with irregular inside walls or of various shapes such as round, square, rectangular and the like.

A further and equally important object of the invention is to provide an attachment for various types and designs of industrial trucks capable of vertically supporting the frame attachment and which attachment has a load supporting and lifting head with a vertical travel providing flexible handling of a maximum or minimum number of stacked or single annular articles and which head is capable of compressing and locking a load of annular articles supported by the head between said frame and said head when conveying the same.

Further objects of the invention will be in part pointed out and in part obvious from the following detailed description of the drawings in which;

FIG. 4 is a top plan view of the present attachment.

FIG. 5 is a vertical cross-sectional view of the attachment and is taken on line 5—5 in FIG. 4, part thereof being shown in elevation for clearness in illustration.

FIG. 6 is a top view of the supporting and gripping head taken on line 6—6 of FIG. 5.

FIG. 10 is a top view partly in section taken on line 10—10 of FIG. 5.

Figure 1:
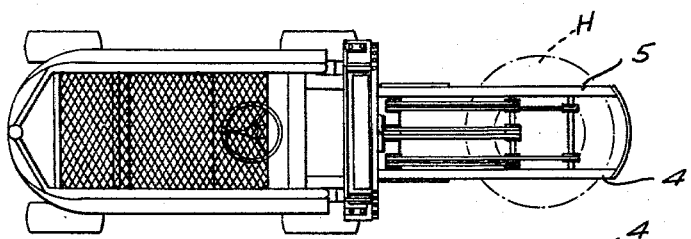
FIG. 1 is a top view of an industrial truck with the present attachment thereon.

And FIG. 11 is a vertical sectional view taken on line 11—11 of FIG. 10.

Referring now more particularly to the accompanying drawings wherein like and corresponding elements are designated by similar reference characters, the invention is described as applied to lifting and transporting stacks of automobile tire casings, its use for lifting and supporting other annular articles being apparent from the illustrative example.

The present attachment can be mounted upon conventional stationary or wheeled vertical masts with or without elevating means such as turnable masts, vertical supports or extensible masts of industrial trucks traveling cranes, monorail conveyors, vertical cranes and the like and as an example only it is shown in the present drawings mounted upon a conventional industrial powered truck A have wheels B and a three section vertical mast C whose sections C, C' and C'' are moveable relative to one another under the control of a hydraulic cylinder, not shown, with uprights 1 and 2 fixedly mounted on section C'' for movement therewith.

Said mast also carries hydraulic hoses D, E, F and G connected to hoses 20, 21, 48 and 49 respectively and to a source of hydraulic fluid under pressure and control valves also, not shown, on truck A.

Uprights 1 and 2 provide the vertical side members of the present attachment and are joined by cross-piece 3 spacing said uprights apart parallel to one another. Arms 4 and 5 are connected at one end to an end of uprights 1 and 2 respectively and extend perpendicular thereto and provide a support for suspending the head. The arms are retained in horizontal position by brace plates 6 connecting said uprights and said arms.

A pair of racks 7 and 8 are fixedly mounted on the front of uprights 1 and 2, respectively, extending in line therewith.

An axle 10 extends laterally of the front of said uprights through a bearing 9 and has pinions 11 and 12 fixedly mounted thereon and engaging the racks 7 and 8, respectively.

Said uprights 1 and 2 further have tracks 13 and 14 on the fronts thereof with rollers 15 and 16 guided in said tracks and carried by the axle 10 for retaining said pinions in engagement with said racks.

A piston rod 17 is connected to bearing 9 and extends within a double acting hydraulic cylinder 18. Said cylinder is fixedly connected to cross-pieces 19 and 22 joining said uprights. A hose 20 is connected to one end of said cylinder while hose 21 is connected to the opposite or lower end.

Four eye bolts 23, 24, 25 and 26 are connected at one end to bearing 9 and at their opposite ends to cables 27, 28, 29 and 30 respectively. Pulleys 31, 32, 33 and 34 are connected to cross-piece 3 and have said cables 27, 28, 29 and 30 respective extending therearound. Further pulleys 31', 32' 33' and 34' are fixedly mounted on axle 10 and said cables 27, 28, 29, and 30 respectively extend therearound after leaving pulleys 31, 32, 33 and 34 and extend up to and around pulleys 36, 37, 38 and 39 respectively mounted on axle 35 rotatably supported by arms 4 and 5.

Axle 40 extending between said arms has pulleys 41, 42, 43 and 44 mounted thereon and cables 27, 28, 29 and 30 respectively next extend thereto and around while cables 27 and 30 drop downwardly and cables 28 and 29 continue to pulleys 46 and 47 mounted on axle 45 supported by said arms. Thus pulleys 41, 44, 46 and 47 provide guide means for the cables 27, 30, 28 and 29, respectively, at the points of dependency of the cables from the support provided by the arms 4 and 5.

A pair of hydraulic hoses 48 and 49 are connected to hose connector blocks 50 and 51 respectively which blocks are fixedly mounted on cross-piece 19. A further hydraulic hose 53 is connected to block 50, extends around pulley 54 carried by counter weight 61, goes over pulley 55 rotatably supported on cross-piece 19 and from there to pulley 60 mounted on axle 40 down to block 92 of the gripping head.

Similarly hydraulic hose 57 is connected to block 51, extends around pulley 58 rotatably carried by counter weights 62 up and over pulley 59 rotatably mounted on cross-piece 19, to pulley 60 on axle 40 and down to block 92 of the gripping head.

Said counter weights 61 and 62 are slideably mounted on guide rods 63 for being guided thereby and said guide rods are connected to cross-piece 19 and bottom plate 19'.

The supporting and lifting head of the present device is shown more in detail in FIGS. 10 and 11 and has an elongated I shaped supporting plate 64. A cylinder 65 is positioned beneath said plate and has a hose 66 connected to one end thereof while hose 67 is connected to the opposite end of said cylinder. A second cylinder 68 extends parallel to said first cylinder beneath said plate and has hose 69 connected to one end with hose 70 connected to the opposite end.

The head includes four shoes 71, 72, 73 and 74 which are pivotally connected to said plate. Each shoe includes a load positioning surface, a lever, and a load supporting projection. The positioning surfaces of the shoes are designated 71a, 72a, 73a and 74a, respectively. Thus shoe 71 is fixedly mounted on one end of its lever 76 whose other end has bolt 75 extending therethrough. Said bolt also extends through plate 64 pivotally connecting said lever thereto. Shoe 72 is fixedly mounted on one of its lever 78 whose other end has a bolt 77 extending therethrough and also through plate 64. Shoe 73 is carried by one end of its lever 80 whose other end is pivotally connected to plate 64 by bolt 79. Likewise the shoe 74 is fixedly carried by one end of its lever 82 whose other end is pivotally connected by bolt 81 to the plate 64. Bolts 75 and 77 extend through one end of the plate 64 while the bolts 79 and 81 extend through the opposite end thereof.

A pin 83 pivotally connects the head 84 of cylinder 65 to lever 76, while piston 85 slideably mounted in said cylinder has a piston rod 86 pivotally connected by pin 87 to lever 82.

Pin 88 pivotally connects head 89 of cylinder 68 to lever 78, while piston rod 90 extending from said cylinder is pivotally connected by pin 91 to lever 80.

A block 92 is positioned between said cylinders and has a pair of L-shaped bores 93 and 94. Hose 57 is connected to one end of bore 93 while hoses 67 and 70 are also connected thereto. Hose 55 is connected to one end of bore 94 while hoses 66 and 69 are also connected to this bore.

A plate 95 similar to plate 64 is positioned beneath block 92 and has bolts 75, 77, 79 and 81 extending therethrough retaining said block and said levers between said plates. Nuts are attached to said bolts for this purpose.

The shoes 71, 72, 73 and 74 have, as mentioned, load supporting projections, respectively, in the form of bottom lateral flanges 96 for a purpose to be hereinafter described.

Cables 29, 30, 31 and 32 are fixedly connected to levers 76, 78, 82 and 80 of the shoes, respectively, for raising and lowering the same, and thereby the head.

To use the present lift attachment uprights 1 and 2 are fixedly attached to the vertical lift mast of the industrial truck such as the top mast section C'' of truck A. The truck is then maneuvered until the gripping head is positioned over the opening in the article or articles to be handled. Such articles may for examples be automobile tire casings or tubes, wire wheels, sewer pipe crocks, street man hold castings, or green ceramic material or practically any type of core. For the present purpose the article is shown in dotted lines as a tire casing H.

Assuming the elements of the lift attachment are as shown in FIG. 5, hydraulic fluid is supplied to hose 21 by the operator of the truck working the proper control valve whereby piston rod 17 will be raised paying out cables 27, 28, 29 and 30 over pulleys 41, 46, 47 and 44 dropping shoes 71, 72, 73 and 74 to the tire casing H. The truck operator by operating the proper valve supplies hydraulic fluid under pressure to hose 53 and thus to hoses 66 and 69 drawing in piston rods 86 and 90 pulling in said shoes. Further lowering of said shoes within casing H is thereby permitted and due to the free swinging of said shoes they will center themselves within the casing center opening. If a stack of casings are to be handled said head, including the shoes, is preferably lowered to the floor or casing supporting surface within the lowermost casing. The projections or flanges 96 have upwardly facing load contacting surfaces, respectively. These load contacting surfaces are positioned so close to the bottom of the head that, upon movement of the shoes to extended position while the head is within the bottom casing and resting on the stack supporting surface, the load contacting surfaces can pass beneath the bottom bead on the bottom tire casing of the stack.

The operator will then direct fluid under pressure to hose 57 and those hoses 67 and 70 pushing out piston rods 86 and 90 from their cylinders pivoting levers 76, 78, 80 and 82 outwardly until said shoes bear tightly against the surrounding casing and flanges 96 are positioned below the bottom bead of the bottom casing, as shown in FIG. 11.

The operator while maintaining pressure in hose 57 introduces fluid under pressure to hose 20 by operating the proper valve. Thus piston rod 17 is forced downwardly moving bearing 9 and due to the travel of pinions 11 and 12 over racks 7 and 8, shaft 10 is rotated as are pulleys 31', 32', 33' and 34' thereby pulling cables 27, 28, 29 and 30 raising said shoes and tire casing H until said casing or the top casing in the case of a stack thereof reaches supports 4 and 5 clamping said casing.

Figure 2:
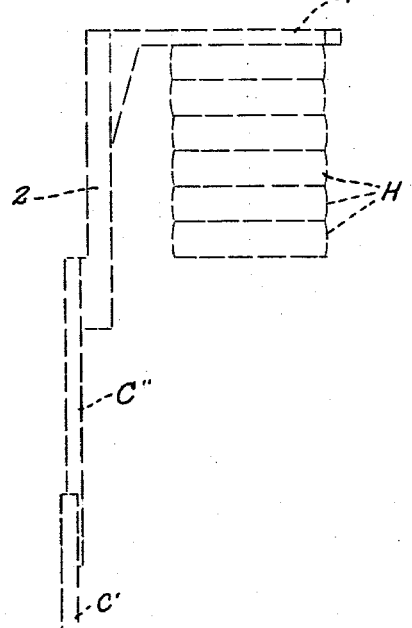
FIG. 2 is a side elevation of said truck and attachment.
Figure 3:
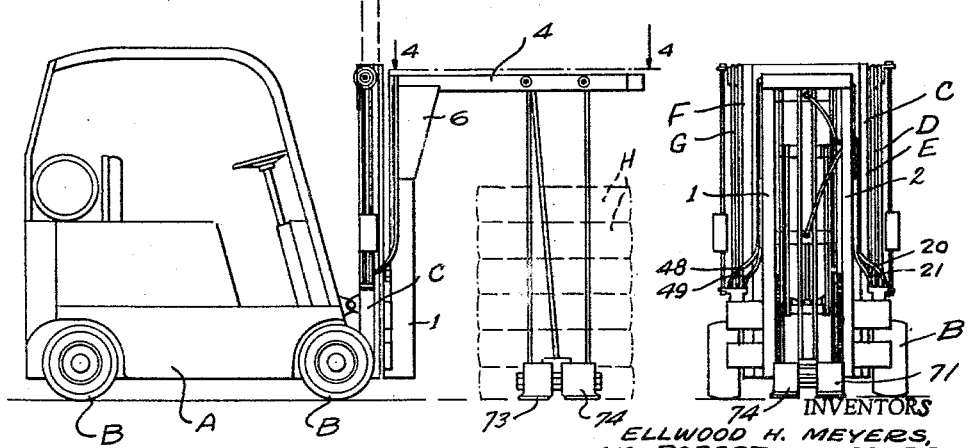
FIG. 3 is a front end view taken from the right of FIG. 2.
Figure 9:
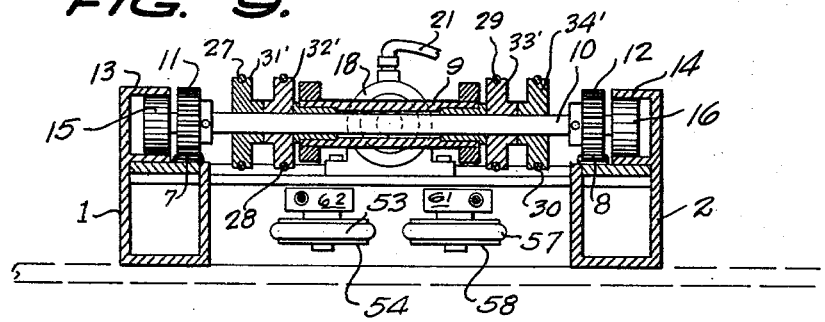
FIG. 9 is an enlarged sectional view taken on line 9—9 of FIG. 7.
Figure 7:
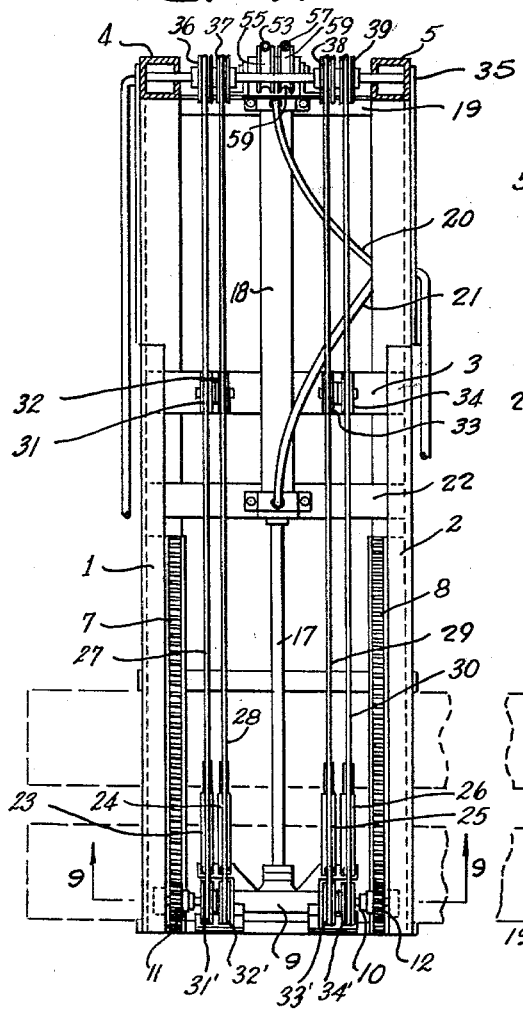
FIG. 7 is a front sectional view of the attachment taken on line 7—7 of FIG. 5.
Figure 8:
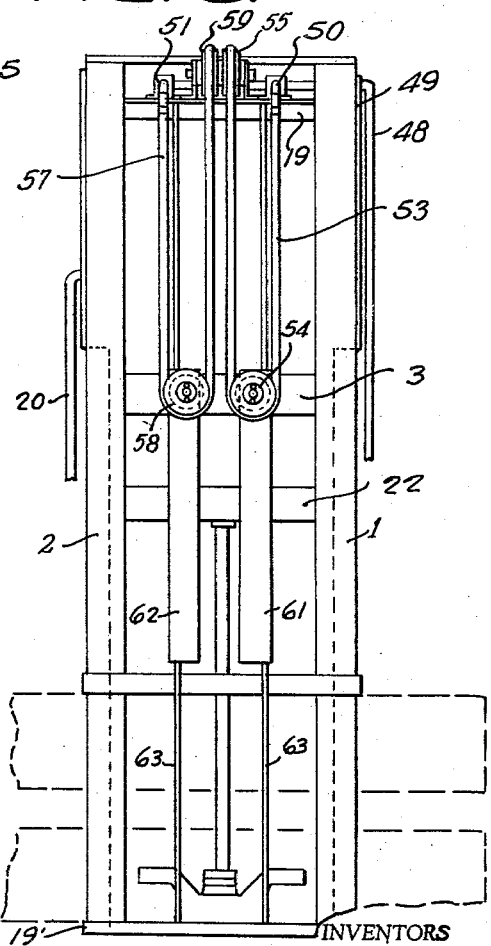
FIG. 8 is a rear view of the attachment taken from the left of FIGS. 4 and 5.

Thereafter truck A can be driven to another location and the tire casing disposed of by lowering said shoes and retracting the same from the casing H or raising sections C, C' and C'' as indicated for example, in FIG. 2, for raising the lift attachment to place the casings at greater heights as is desirable in storage warehouses. It is to be understood that various combinations of movements of the element hereof can be effected as each circumstances dictates.

Counterweights 61 and 62 maintain hoses 57 and 53 taut at all times.

Whereas hydraulically operated cylinders 18, 65 and 68 have been described for operating the present lift, it is to be appreciated that more than two cylinders can be used as well as other forms of motive power can be utilized for these purposes, as for example electric motors and appropriate operating elements, connected by wires to a source of electrical current as substitutes for said cylinders and their connected hoses 20, 21 and 53 and 57.

The load supporting and lifting head will adjust shoes 71–74 so that the positioning surfaces 71a through 74a fit tightly against the inner wall of the bead of the bottom casing, regardless of the size of its central opening. It is to be noted that the cables 27, 28, 29 and 30 are connected to the shoes, and thereby to the head, outwardly from the central upright axis of the head and preferably at locations near the outer peripheral boundary of the head. The points of dependency provided by the pulleys 41, 46, 47 and 44, respectively, are spaced outwardly from the central axis far enough so that the cables are sufficiently close to the inner walls of the beads to be engaged thereby for limiting transverse misalignment of the casings in the stack. Also, the cables can engage the beads of casings if they are substantially misaligned and force them more nearly into coaxial relation with other casings in the stack. Since the points of connection of the cables to the shoes are near the positioning surfaces of the shoes, respectively, and are movable with the shoes as the shoes move from their retracted to their extended positions, respectively, cooperation of the cables and casings in the stack is maintained for different diameters of beads.

It is also to be noted that the overall height of the head is less than the maximum radius of the head in the fully retracted position of the shoes. The height is preferably approximately the overall axial dimension of a tire casing so that a single tire can be brought very close to the under surface of the support provided by the arms 4 and 5, and if two or more tire casings are in the stack, the top casing can be brought into engagement with the underside of the support by the head.

The present device is capable of considerable modification and such changes thereto as come within the scope of the appended claims is deemed to be a part of the present invention.

We claim:

1. A lift attachment for lifting articles having central openings and comprising a frame;

a support thereon;

a lift head including a body, at least three weight supporting shoes, connecting means connecting the shoes to the body in spaced relation to each other about an upright central axis for movement outwardly from the axis in paths spaced from each other about said axis to an extended position and inwardly toward the axis to a retracted position;

at least three flexible cables depending from the support and operatively connected to the head and suspending the head from, and beneath, the support for free lateral swinging of the head;

power operable means for paying out the cables concurrently for lowering the head and for retracting the cables concurrently for lifting the head;

said head, when the shoes are in retracted position, being receivable through the central openings of the articles by lowering the head axially through the central openings while the articles are supported in a stack with the axes of their central openings upright;

additional power operable means carried by the head for moving the shoes, substantially concurrently, to and from said positions, selectively;

said shoes being operative when in an extended position to engage and support any selected one of the articles in which the head is disposed, and when in a retracted position, to release said selected one of the articles, the lowermost limits of said shoes being close to the bottom of the head in all positions of the shoes;

said cables being operatively connected to the shoes, respectively, near the outer faces of the shoes, each for movement of its point of connection outwardly and inwardly relative to the central axes of the head with its associated shoe upon movement of its associated shoe to extended and retracted positions, respectively;

guide means mounted on the support and engaging the cables, respectively, at the points of dependency of the cables from the support;

and said guide means being spaced outwardly from an upright central axis and spaced apart from each other circumferentially of said central axis, so that, when the head is freely suspended by the cables, the location of the point of connection of each cable with the head and its point of dependency are approximately vertically aligned with each other, when the shoes are in extended position against the walls defining the central openings of the articles, respectively, the cables are substantially at said walls, respectively.

2. The structure according to claim 1 wherein the connecting means are levers connected to said body for lifting and lowering therewith and for swinging outwardly and inwardly relative thereto about substantially upright axes, respectively, which are spaced apart from each other about, and outwardly from, said central axis of the head, the shoes are connected to the levers, respectively, near the outer ends of the levers, each for swinging outwardly and inwardly with its associated lever, and the lower ends of the cables are connected to the levers, respectively, each near the outermost limit of its associated shoe, and each for movement with its associated lever outwardly and inwardly relative to the central axis of the head.

3. The structure according to claim 1 wherein said shoes have load supporting projections, respectively, located at the bottom of the head and extending outwardly from the head, and said projections have upwardly facing surfaces, respectively, located close to the bottom of the head.

4. The structure according to claim 1 wherein said shoes have generally upright outwardly facing surfaces extending upwardly from the bottom of the head and operative to tightly engage the wall defining the central opening of the selected article when the shoes are extended.

5. The structure according to claim 1 wherein the support includes an upright mast, a substantially horizontal, laterally extending arm is connected to the top of the mast, said cables depend from the arm, and, in the fully raised position of the head, the uppermost part of said head is closely adjacent the underside of the arm, the upper side of the arm is substantially the uppermost part of the support, the head is of less height than width, and the space between the underside of the arm and the head is free from obstructions which can interfere with the lifting of the head to its fully raised position by the cables, so that, when a stack of said articles is supported on the head, the stack can be drawn tightly against the underside of the arm by the head, thereby clamping the articles in the stack tightly against each other and clamping the stack firmly in hoisted position to constrain it from swinging laterally.

References Cited by the Examiner

UNITED STATES PATENTS

| | | | |
|---|---|---|---|
| 2,203,799 | 6/40 | Shaffer | 294—88 |
| 2,349,689 | 5/44 | Aldrich | 294—97 X |
| 2,526,725 | 10/50 | Bronson | 294—95 X |
| 2,687,226 | 8/54 | Garrett | 214—620 |
| 2,696,920 | 12/54 | Anjeskey | 294—93 X |
| 2,736,445 | 2/56 | Hoban. | |
| 2,760,661 | 8/56 | Wight et al. | 214—620 |
| 2,812,070 | 11/57 | Delzer | 214—658 |
| 2,915,332 | 12/59 | Cotesworth et al. | |
| 2,928,540 | 3/60 | Cunningham. | |
| 2,931,530 | 4/60 | Arnot | 214—652 |
| 2,990,074 | 6/61 | Berquist et al. | 214—620 |
| 3,033,605 | 5/62 | Morrow | 294—97 |
| 3,118,555 | 1/64 | Bent et al. | 214—620 X |

HUGO O. SCHULZ, *Primary Examiner.*

MORRIS TEMIN, *Examiner.*